US009341206B2

(12) United States Patent
Rouleau et al.

(10) Patent No.: US 9,341,206 B2
(45) Date of Patent: May 17, 2016

(54) FLANGE FOR SUPPORT CHANNEL ASSEMBLY

(71) Applicant: Panduit Corp., Tinley Park, IL (US)

(72) Inventors: Rodney Rouleau, Manhattan, IL (US); James Banaszak, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/205,537

(22) Filed: Mar. 12, 2014

(65) Prior Publication Data

US 2014/0259566 A1 Sep. 18, 2014

Related U.S. Application Data

(60) Provisional application No. 61/790,584, filed on Mar. 15, 2013.

(51) Int. Cl.

| | |
|---|---|
| ***F16L 3/00*** | (2006.01) |
| ***F16B 5/06*** | (2006.01) |
| ***F16B 7/04*** | (2006.01) |
| ***F16L 3/24*** | (2006.01) |
| ***H02G 3/30*** | (2006.01) |
| ***F16B 2/08*** | (2006.01) |
| *H02G 3/32* | (2006.01) |
| *H02G 3/00* | (2006.01) |

(52) U.S. Cl.

CPC ................ *F16B 5/0685* (2013.01); *F16B 2/08* (2013.01); *F16B 7/0473* (2013.01); *F16L 3/24* (2013.01); *H02G 3/30* (2013.01); *H02G 3/263* (2013.01); *H02G 3/32* (2013.01); *Y10T 24/44017* (2015.01)

(58) Field of Classification Search

USPC ........ 248/62, 65, 68.1, 74.1, 74.3; 411/84, 85

See application file for complete search history.

(56) References Cited

U.S. PATENT DOCUMENTS

| | | | | |
|---|---|---|---|---|
| 2,380,379 | A * | 7/1945 | Attwood | 248/163.1 |
| 2,384,158 | A | 9/1945 | Carpenter et al. | |
| 2,578,008 | A | 12/1951 | Judd | |
| 2,696,139 | A * | 12/1954 | Attwood | 411/427 |
| 3,429,601 | A | 2/1969 | Bremers | |
| 4,353,519 | A | 10/1982 | Bogart | |
| 4,542,871 | A | 9/1985 | Fortsch | |
| 4,545,697 | A | 10/1985 | Verdenne et al. | |
| 4,575,295 | A * | 3/1986 | Rebentisch | 411/85 |
| 4,638,966 | A | 1/1987 | Ford | |
| 4,662,590 | A | 5/1987 | Hungerford, Jr. | |
| 4,708,554 | A | 11/1987 | Howard | |

(Continued)

FOREIGN PATENT DOCUMENTS

| | | |
|---|---|---|
| CH | 668816 A5 | 1/1989 |
| DE | 4344144 A1 | 7/1994 |

(Continued)

*Primary Examiner* — Steven Marsh

(74) *Attorney, Agent, or Firm* — Christopher S. Clancy; James H. Williams; .Aimee E. McVady

(57) ABSTRACT

The present invention is directed to a support channel assembly that secures and supports a bundle. The support channel assembly includes a support channel having a bottom and two sides and at least one flange. Each side of the support channel having a hook at a distal end. The flange has a top, a bottom and sides. The flange includes a locking tie receiving area for receiving a locking tie to secure the bundle and a support channel engaging area for receiving the hooks of the support channel to secure the flange to the support channel.

9 Claims, 13 Drawing Sheets

68
160
150
152
60
30
68

(56) References Cited

U.S. PATENT DOCUMENTS

| | | | | |
|---|---|---|---|---|
| 4,917,553 | A | 4/1990 | Muller | |
| 4,961,553 | A | 10/1990 | Todd | |
| 5,118,233 | A * | 6/1992 | Mitchell | 411/5 |
| 5,484,123 | A | 1/1996 | Logan | |
| 5,624,217 | A | 4/1997 | Hungerford, Jr. | |
| 6,105,216 | A | 8/2000 | Opperthauser | |
| 6,305,650 | B1 | 10/2001 | Hawkins et al. | |
| 6,679,461 | B1 | 1/2004 | Hawkins | |
| 6,872,038 | B2 | 3/2005 | Westlake | |
| 7,246,547 | B2 | 7/2007 | Van Walraven | |
| 7,735,270 | B2 | 6/2010 | Olle et al. | |
| 8,091,839 | B2 | 1/2012 | Whipple et al. | |
| 8,132,992 | B2 | 3/2012 | Van Walraven | |
| 8,181,916 | B2 | 5/2012 | Azuma et al. | |
| 9,103,365 | B2 | 8/2015 | Whipple et al. | |
| 2003/0049094 | A1* | 3/2003 | Westlake | 411/84 |
| 2011/0180320 | A1 | 7/2011 | Thomas | |

FOREIGN PATENT DOCUMENTS

| | | | |
|---|---|---|---|
| DE | 4303112 | A1 | 8/1994 |
| FR | 1472658 | A | 3/1967 |
| FR | 2517411 | A1 | 6/1983 |

* cited by examiner

FLANGE FOR SUPPORT CHANNEL ASSEMBLY

CROSS-REFERENCE TO RELATED APPLICATIONS

This application claims priority to U.S. Provisional Application No. 61/790,584, filed Mar. 15, 2013, the subject matter of which is hereby incorporated by reference in its entirety.

BACKGROUND OF THE INVENTION

The present invention relates to a support channel, and more particularly, to a flange used to secure a bundle to a support channel.

SUMMARY OF THE INVENTION

The present invention is directed to a support channel assembly designed to support a bundle. The support channel has a bottom and two sides. Each side includes a hook at a distal end of the side. The assembly also includes a flange that engages the support channel. The flange has a top, a bottom and sides. The sides of the flange define a locking tie receiving area to receive a locking tie to secure the bundle and a support channel engaging area for receiving the hooks of the support channel.

The present invention is also directed to a support channel assembly with a support channel having a bottom, a long side, and a short side. The long side and the short side of the support channel each having a hook at a distal end. The flange has a top, a bottom, a first side and a second side. The top of the flange defines a locking tie receiving area and the first side and the second side of the flange define support channel engaging areas for receiving the hooks of the support channel.

DETAILED DESCRIPTION

Figure 1:
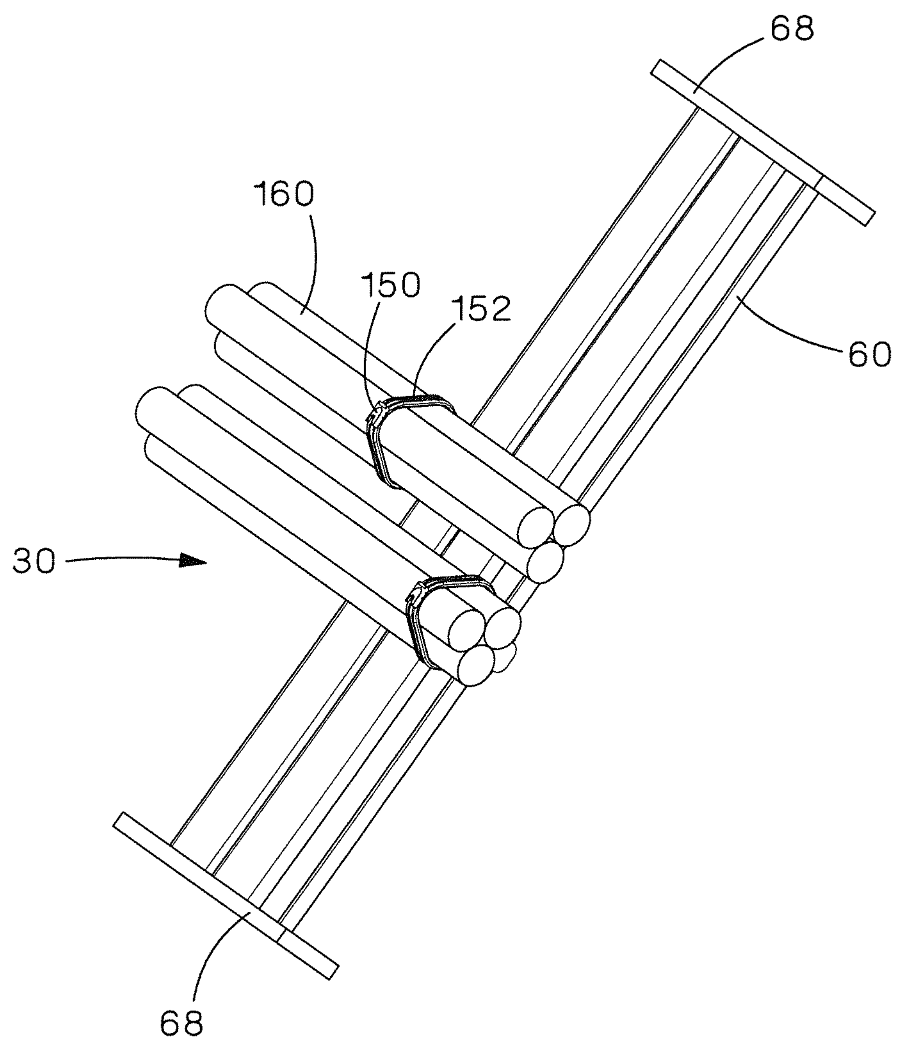
FIG. 1 is a front perspective view of a bundle secured to an outside flange installed in a support channel.
Figure 2:
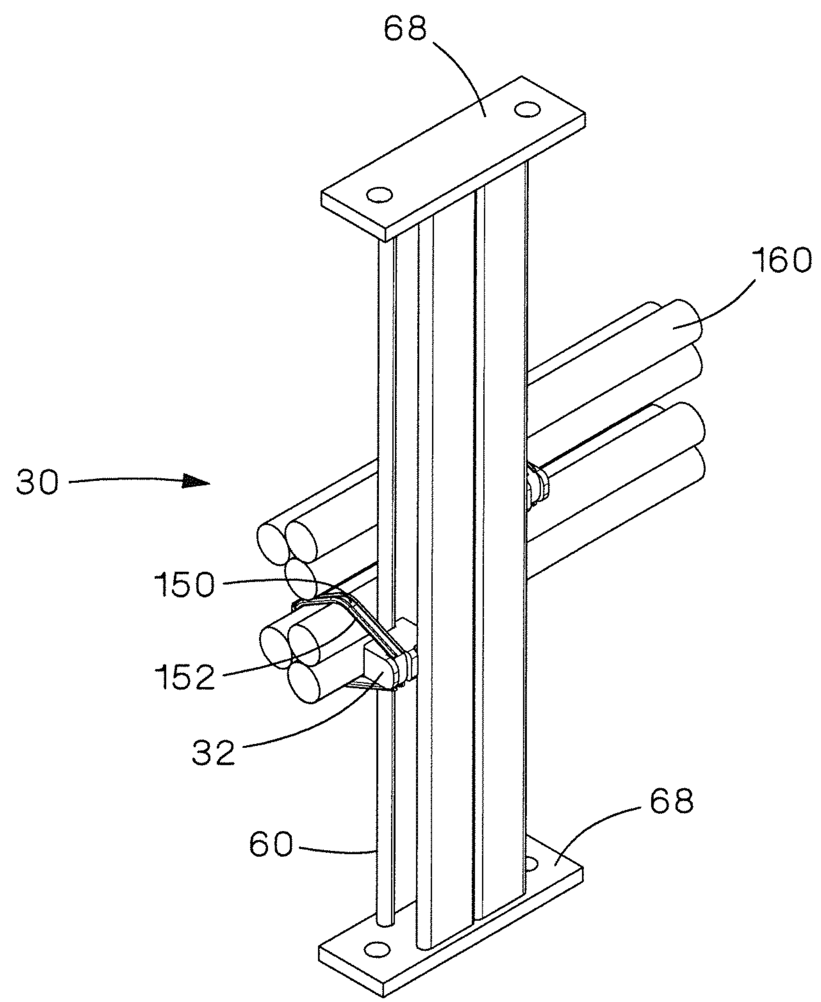
FIG. 2 is a rear perspective view of an outside flange installed in the support channel of FIG. 1.
Figure 3:
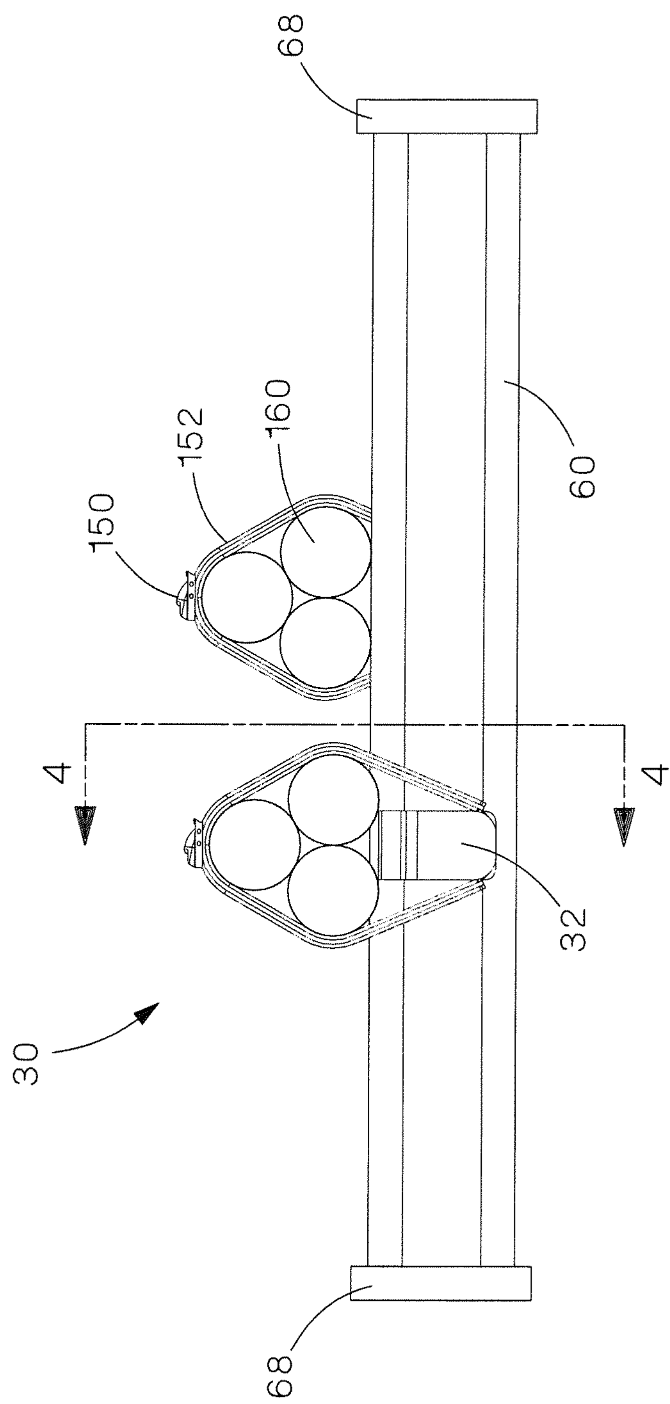
FIG. 3 is a front view of the outside flange and support channel of FIG. 2.

FIGS. 1-4 illustrate the outside flange for support channel assembly 30 of the present invention. An outside flange 32 is installed in a support channel 60. A bundle 160 is secured to the outside flange 32 via a metal locking tie 150 with a cushion sleeve 152. The support channel 60 is U-shaped with a bottom 62 and two sides 64 (see FIG. 4). The distal end of each of the sides 64 includes a hook 66. As illustrated in FIGS. 1 and 2, the support channel 60 includes end plates 68 positioned at each end of the support channel 60.

Figure 4:
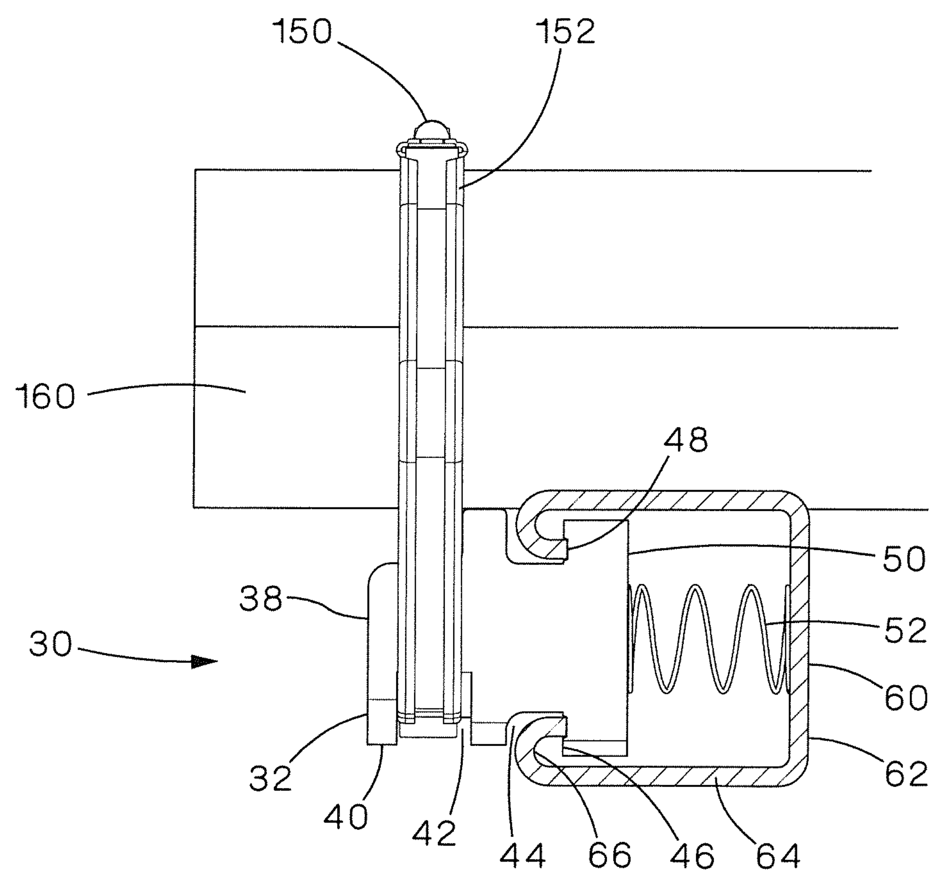
FIG. 4 is a cross sectional view of the outside flange and support channel of FIG. 3 taken along line A-A.

The outside flange 32 includes a top 38, sides 40, and a groove 42 defined in one of the sides 40. As illustrated in FIG. 4, the groove 42 receives the cushion sleeve 152 and metal locking tie 150. The outside flange 32 also includes cut-out notches 44 in each side 40 and a bottom 50. Each cut-out notch 44 defines a top surface 46 and an indentation 48. As illustrated in FIG. 4, the indentations 48 receive the hooks 66 at the distal end of the sides 64 of the support channel 60. A spring 52 extends from the center of the bottom 50 of the outside flange 32.

Figure 5A:
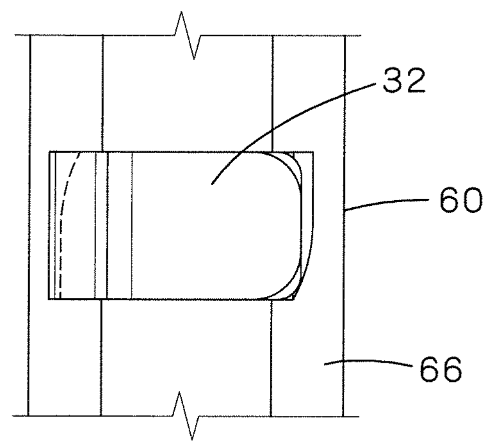
FIG. 5A is a top view of the outside flange positioned above the support channel of FIG. 1.
Figure 5B:
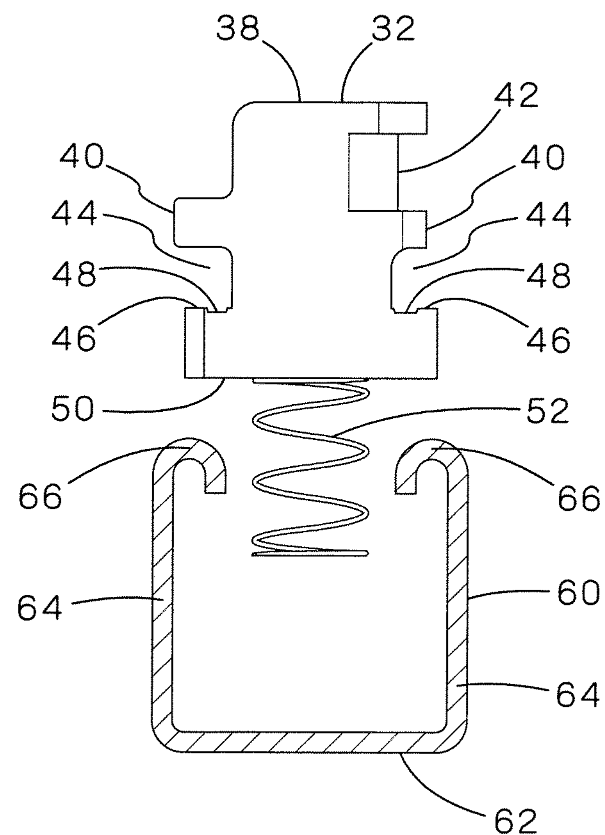
FIG. 5B is a cross sectional view of the outside flange of FIG. 5A positioned above the support channel.
Figure 6A:
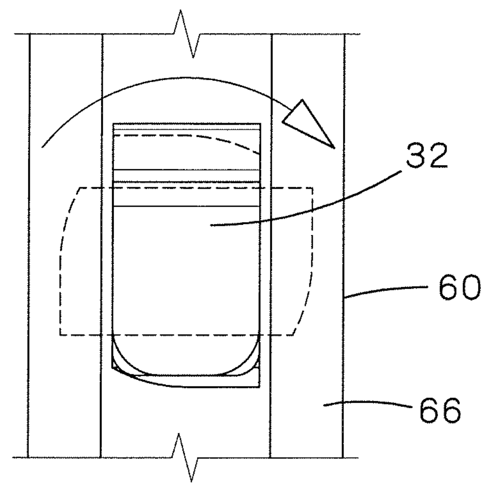
FIG. 6A is a top view of the outside flange rotated into position to be installed in the support channel of FIG. 1.
Figure 6B:
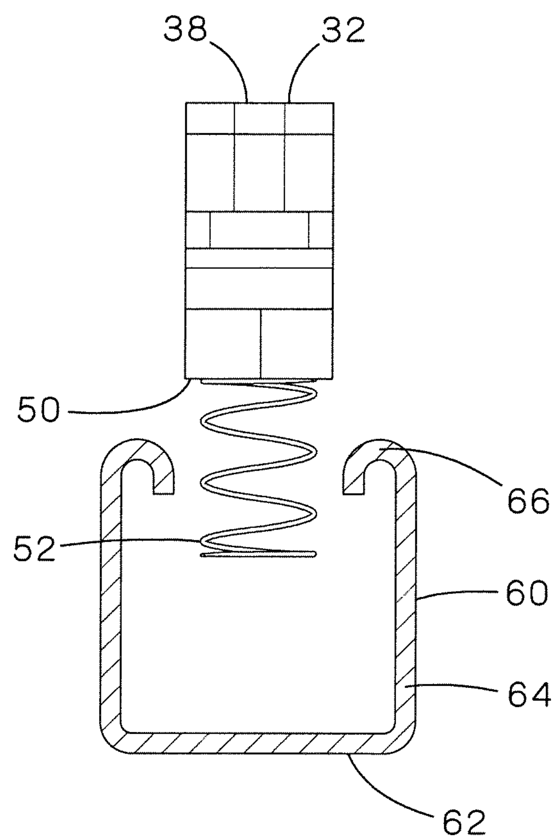
FIG. 6B is a cross sectional view of the outside flange of FIG. 6A positioned to be installed in the support channel.
Figure 7A:
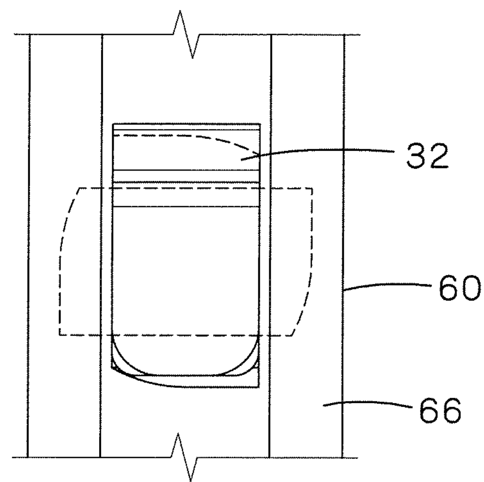
FIG. 7A is a top view of the outside flange partially installed in the support channel of FIG. 1.
Figure 7B:
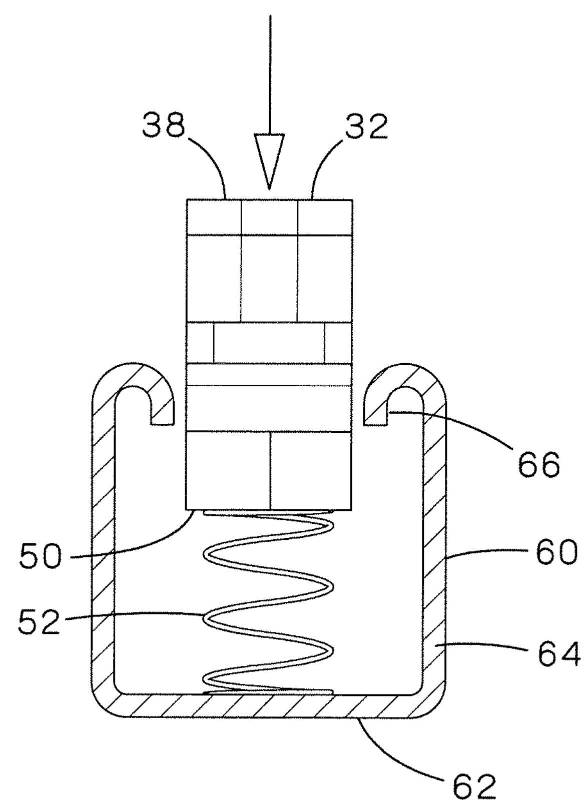
FIG. 7B is a cross sectional view of the outside flange of FIG. 7A partially installed in the support channel.
Figure 8A:
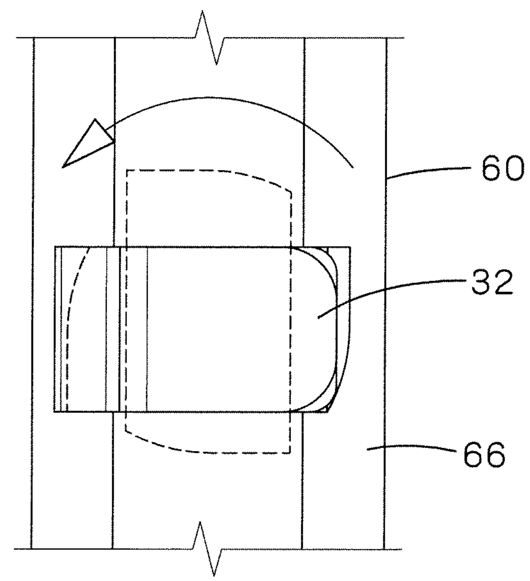
FIG. 8A is a top view of the outside flange partially installed in the support channel of FIG. 1.
Figure 8B:
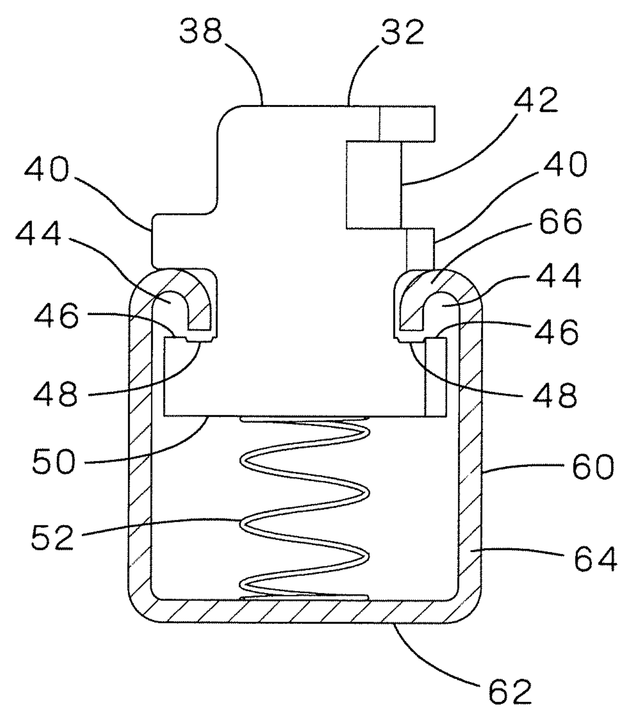
FIG. 8B is a cross sectional view of the outside flange of FIG. 8A partially installed in the support channel.
Figure 9A:
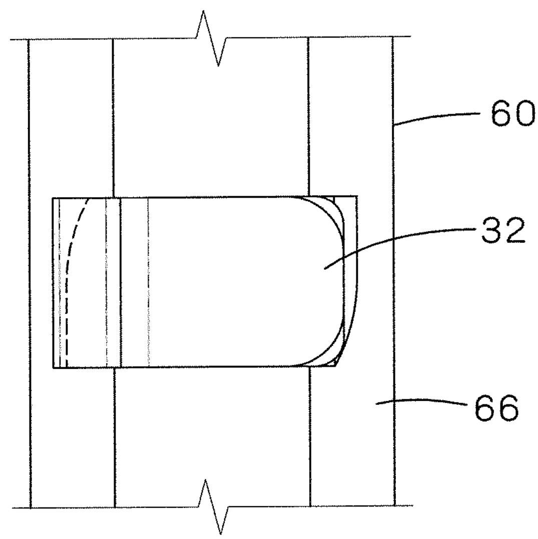
FIG. 9A is a top view of the outside flange installed in the support channel of FIG. 1.
Figure 9B:
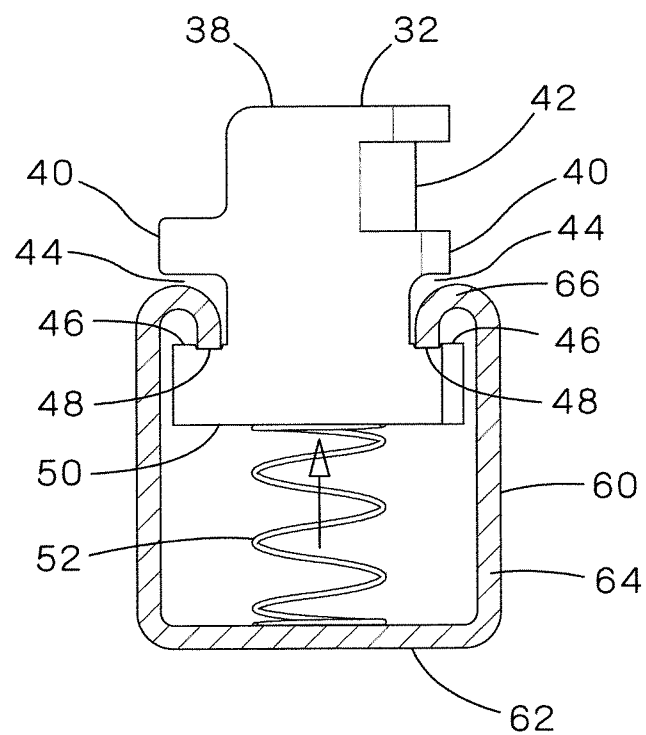
FIG. 9B is a cross sectional view of the outside flange of FIG. 9A installed in the support channel.

FIGS. 5A-9B illustrate the installation of the outside flange 32 into the support channel 60. As illustrated in FIGS. 5A-5B, the outside flange 32 is positioned to be installed in the support channel 60. Next, the outside flange 32 is rotated 90 degrees (see FIGS. 6A-6B) and placed in the support channel 60 (see FIGS. 7A-7B). The spring 52 is then compressed to allow the outside flange 32 to rotate 90 degrees back to its original position (see FIGS. 8A and 8B). Once the outside flange 32 has been rotated to its original position, the outside flange 32 is released allowing the spring 52 to expand and the outside flange 32 to raise towards the hooks 66. As a result, the hooks 66 at the distal ends of the sides 64 of the support channel 60 are positioned in the indentations 48 of the outside flange 32 (see FIGS. 9A and 9B).

Once the outside flange 32 is installed in the support channel 60, the metal locking tie 150 and cushion sleeve 152 are looped around the bundle 160 being secured. The metal locking tie 150 is rotated to a convenient location and tensioned by a metal locking tie tool (not illustrated).

The outside flange for the support channel assembly is an improvement over other bundle attaching devices because the installation time has been reduced and the number of parts has been reduced. The outside flange can accommodate a wide range of conduit, pipe, or cable diameters. The outside flange can be repositioned at any point along the support channel and the outside flange is compatible with common channel support systems. The outside flange is tamper resistant and provides a lower profile than traditional fastening methods.

Figure 10:
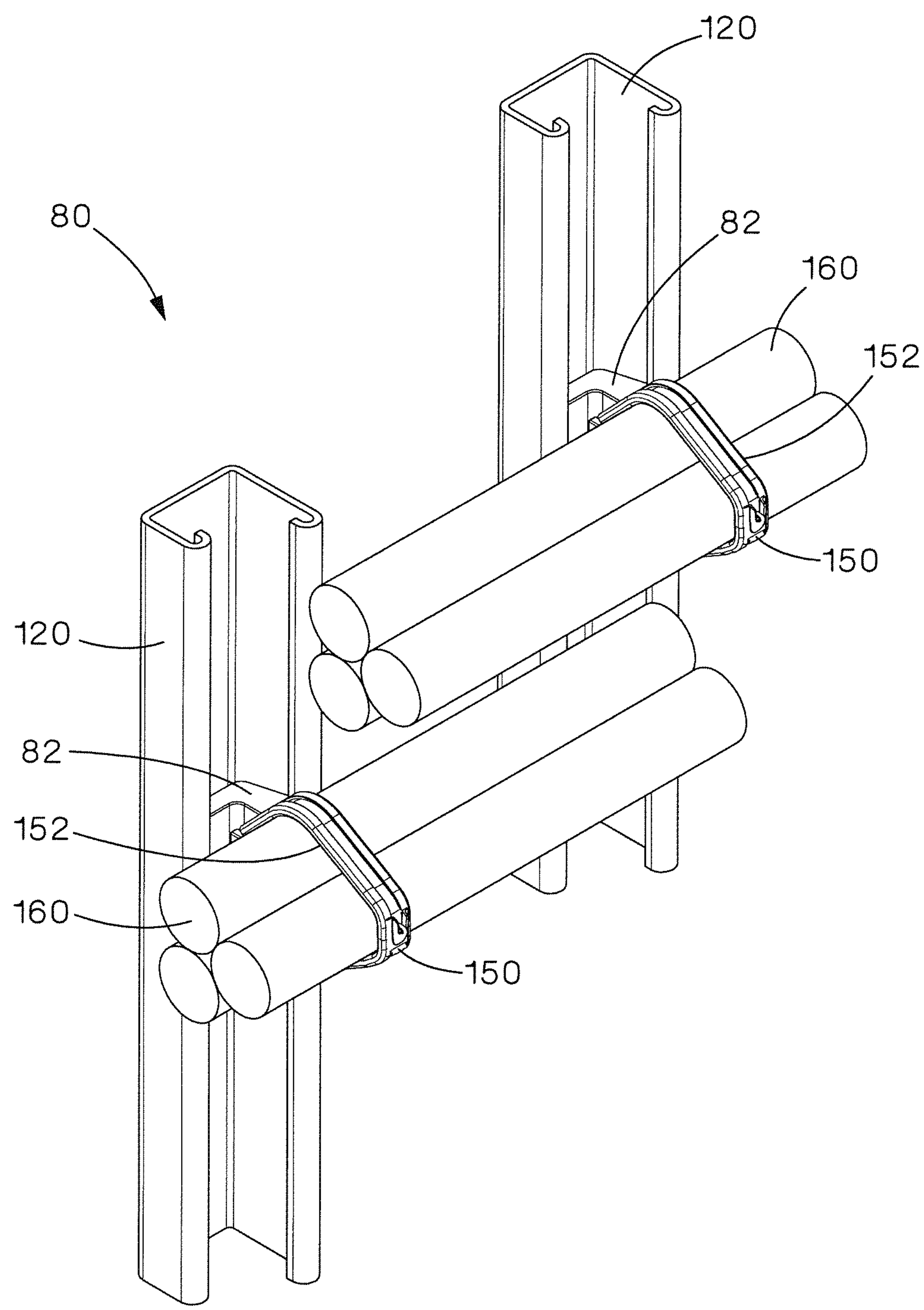
FIG. 10 is a perspective view of an inside flange installed in an alternative support channel.
Figure 11:
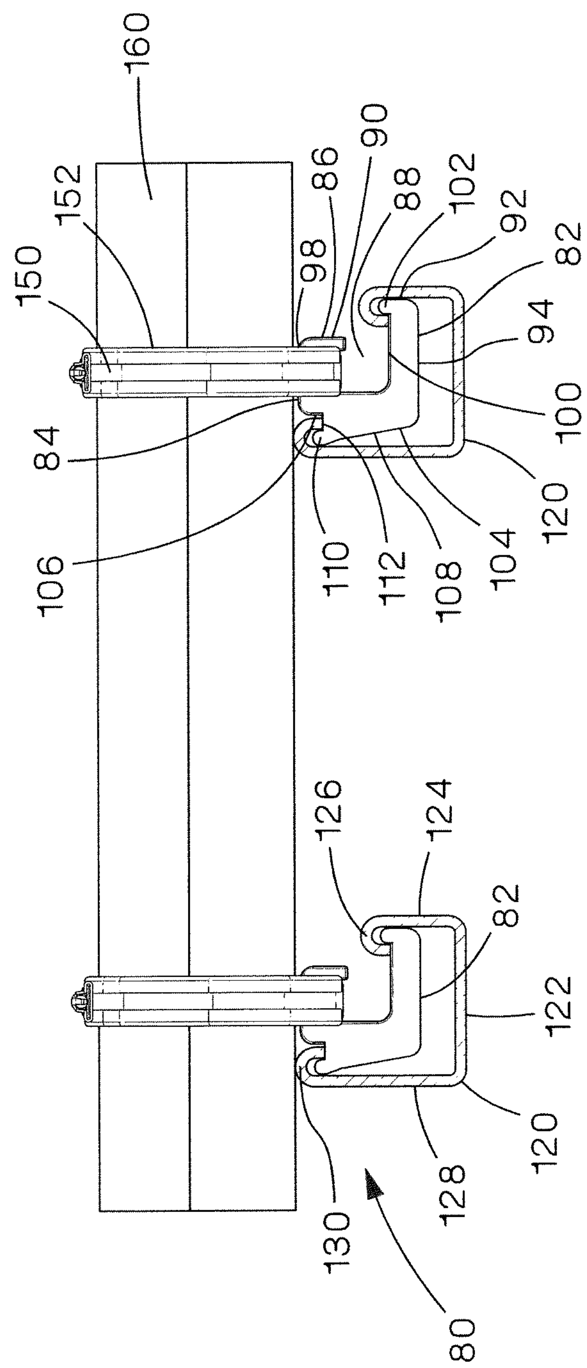
FIG. 11 is an end view of the inside flange installed in the support channel of FIG. 10.

FIGS. 10-16 illustrate an alternative inside flange for support channel assembly 80. As illustrated in FIGS. 10 and 11, an inside flange 82 is installed in the J-shaped support channel

120. A metal locking tie 150 with a cushion sleeve 152 secures a bundle 160 to the inside flange 82 installed in the support channel 120.

The support channel 120 is generally J-shaped with a bottom 122, a short side 124, and a long side 128. The distal end of each side 124, 128 includes a hook 126, 130, respectively. The support channel 120 is designed with one side shorter than the other to enable placement of a metal locking tie 150 into the support channel 120 while the bundle 160 rests on the longer side 128. The metal locking tie 150 is tensioned via a metal locking tie tool (not illustrated) to secure the bundle 160 firmly against the support channel 120.

The inside flange 82 includes a top 84, a first side 86, a bottom 94, and a second side 104. The first side 86 includes an opening 88 dividing the first side 86 into an upper first side 90 and a lower first side 92. The inside flange 82 also includes a groove 98 defined by the top 84, the upper first side 90, and the opening 88. The groove 98 receives the cushion sleeve 152 and the metal locking tie 150. The inside flange 82 also includes a top engagement surface 100 with a projection 102. As illustrated in FIG. 11, when the inside flange 82 is installed in the J-shaped support channel 120, the hook 126 at the distal end of the short side 124 engages the top engagement surface 100 of the inside flange 82.

The second side 104 includes an upper second side 106 and an angled second side 108. The angled second side 108 extends from the bottom 94 to a projection 110. The second side 104 also includes an indentation 112 that is defined by the projection 110 and the upper second side 106. As illustrated in FIG. 11, when the inside flange 82 is installed in the J-shaped support channel 120, the hook 130 at the distal end of the long side 128 engages the indentation 112 of the second side 104.

The bottom 94 includes a spring 96 attached at the center of the bottom 94. As discussed below, the spring 96 enables the inside flange 82 to be installed in the support channel 120.

Figure 14:
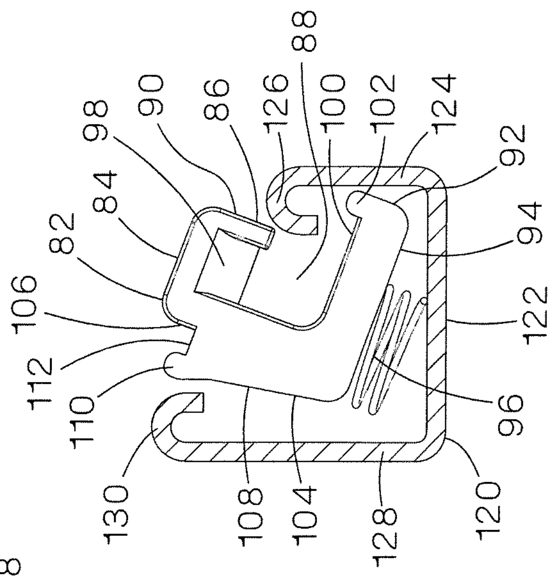
FIG. 14 is an end view of the inside flange partially installed in the support channel of FIG. 10.
Figure 13:
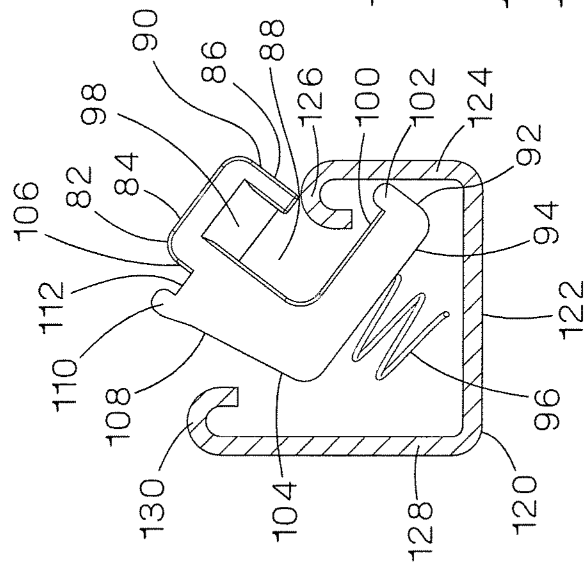
FIG. 13 is an end view of the inside flange partially installed in the support channel of FIG. 10.
Figure 12:
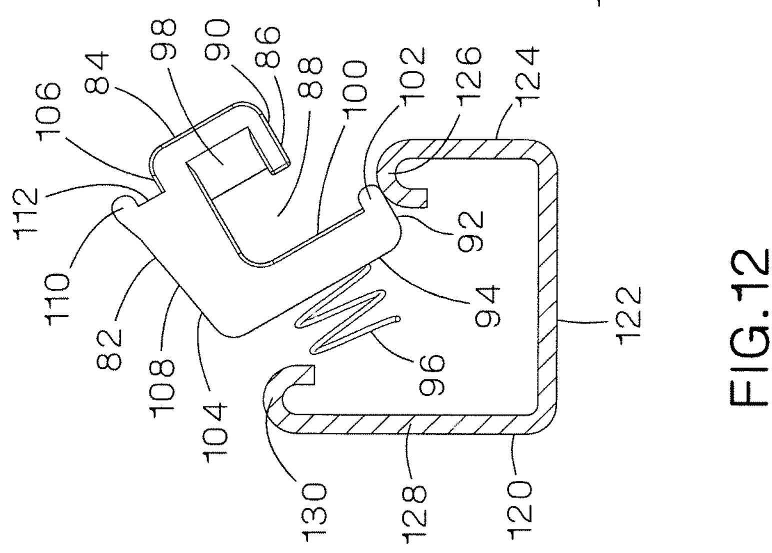
FIG. 12 is an end view of the inside flange positioned to be installed in the support channel of FIG. 10.
Figure 16:
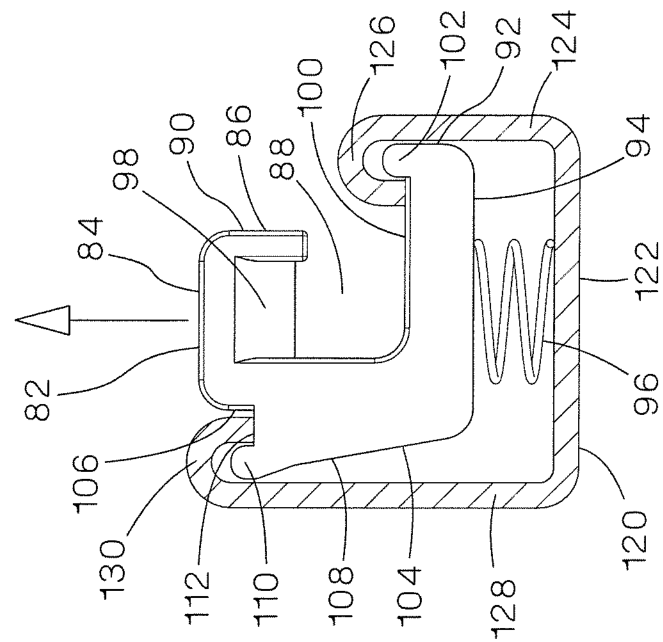
FIG. 16 is an end view of the inside flange installed in the support channel of FIG. 10.
Figure 15:
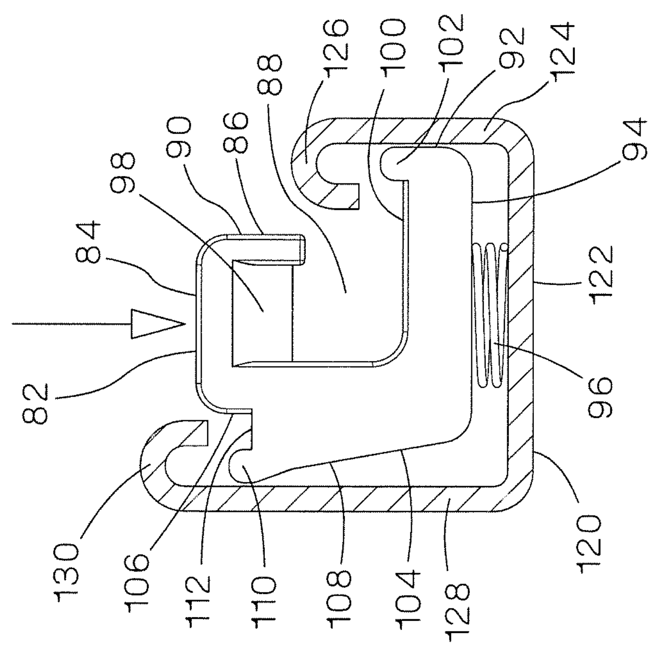
FIG. 15 is an end view of the inside flange partially installed in the support channel of FIG. 10.

FIGS. 12-16 illustrate the installation of the inside flange 82 in the J-shaped support channel 120. FIG. 12 illustrates the inside flange 82 positioned to be inserted into the support channel 120. The lower first side 92 contacts the outer surface of the hook 126 at the distal end of the short side 124 of the support channel 120. FIGS. 13 and 14 illustrate the inside flange 82 being rotated and pushed downward compressing the spring 96 attached to the bottom 94 of the inside flange 82. FIG. 15 illustrates the inside flange 82 pushed downward until the spring 96 is fully compressed and the inside flange 82 is positioned in the support channel 120. Once the inside flange 82 is released, the spring 96 expands raising the inside flange 82 to the installed position. FIG. 16 illustrates the inside flange 82 in the installed position. The hook 126 at the distal end of the short side 124 engages the top engagement surface 100. The hook 130 at the distal end of the long side 128 engages the indentation 112. The inside flange 82 is held in place by the spring 96 until the metal locking tie 150 is installed.

The inside flange for the support channel assembly is also an improvement over other bundle attaching devices because the installation time has been reduced and the number of parts has been reduced. The inside flange can accommodate a wide range of conduit, pipe, or cable diameters. The inside flange can be repositioned at any point along the support channel. The inside flange is tamper resistant and provides a lower profile than traditional fastening methods.

The inside flange can be added to the support channel after the bundle is installed for additional support, if necessary. The J-shaped support channel is manufactured with less steel than a tradition U-shaped channel. Thus, the J-shaped channel is less expensive and lighter than traditional support channels.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A support channel assembly for supporting a bundle, the support channel assembly comprising:

a support channel having a bottom and two sides, wherein each side has a hook at a distal end;

at least one flange engaging the support channel, the at least one flange having a top, a bottom and sides, wherein one of the sides of the at least one flange defines a groove for receiving a locking tie to secure the bundle, and wherein the sides of the at least one flange further define a support channel engaging area; and at least one locking tie for securing the bundle on the support channel, wherein the at least one locking tie wraps around the at least one flange and sits in the groove of the flange.

2. The support channel assembly of claim 1, wherein the sides of the at least one flange further comprise cut-out notches, each cut-out notch defines a top surface and an indentation.

3. The support channel assembly of claim 2, wherein the hooks at the distal end of the sides of the support channel are positioned in the indentations.

4. The support channel assembly of claim 2, wherein the cut-out notches divide the at least one flange into an upper member and a lower member, the upper member extending outside the support channel.

5. The support channel assembly of claim 4, wherein the groove is in the upper member and the support channel engaging area is in the lower member.

6. The support channel assembly of claim 1, wherein the at least one flange further comprising a spring extending from the bottom of the flange, whereby the spring enables the flange to rotate from an initial position to an installed position within the support channel.

7. The support channel assembly of claim 1, wherein the at least one flange extends partially outside of the support channel.

8. The support channel assembly of claim 1, wherein the groove defines a first axis and the sides of the support channel define a second axis; wherein the first axis is perpendicular to the second axis.

9. The support channel assembly of claim 1, wherein the at least one locking tie secures the bundle positioned along one of the sides of the support channel.

* * * * *